United States Patent [19]

Matsumoto et al.

[11] Patent Number: 5,435,211
[45] Date of Patent: Jul. 25, 1995

[54] CONTROL SYSTEM FOR TORQUE CONVERTER

[75] Inventors: Akio Matsumoto, Hiroshima; Tomoo Sawazaki, Higashi-Hiroshima; Junichi Doi, Hiroshima, all of Japan

[73] Assignee: Mazda Motor Corporation, Hiroshima, Japan

[21] Appl. No.: 85,795

[22] Filed: Jul. 6, 1993

[30] Foreign Application Priority Data

Jul. 6, 1992 [JP] Japan .................................. 4-178512
Sep. 25, 1992 [JP] Japan .................................. 4-256483

[51] Int. Cl.$^6$ ........................ F16H 61/14; F16K 17/30
[52] U.S. Cl. ................................ 74/733.1; 192/3.3; 192/3.58
[58] Field of Search ................ 74/733.1; 475/65; 192/3.3, 3.29, 358; 137/625.6, 625.62

[56] References Cited

U.S. PATENT DOCUMENTS

| | | | |
|---|---|---|---|
| 4,624,284 | 11/1986 | Lembke | 137/625.62 |
| 4,664,235 | 5/1987 | Yokoyama et al. | 192/3.58 X |
| 4,732,245 | 3/1988 | Hiramatsu | 192/3.3 X |
| 4,966,263 | 10/1990 | Hayasaki | 192/3.3 |
| 5,152,386 | 10/1992 | Imamura | 192/3.3 X |

FOREIGN PATENT DOCUMENTS 63-186055 8/1988 Japan .
1-250667 10/1989 Japan .

*Primary Examiner*—Rodney H. Bonck
*Attorney, Agent, or Firm*—Keck, Mahin & Cate

[57] ABSTRACT

A control system for a torque converter includes a lockup clutch provided in the converter for connecting input and output shafts of the torque converter directly. The lockup clutch includes an engaging chamber and a releasing chamber. The control system further includes a lockup shift valve for selectively switching communication between a fluid line, having a predetermined pressure, and the engaging chamber and communication between the fluid line and the releasing chamber. A lockup control valve is provided for controlling a pressure difference between fluid pressures in the engaging chamber and the releasing chamber and a control valve is provided for controlling the lockup clutch so that it engages completely. A first on-off solenoid valve controls the lockup shift valve, a duty solenoid valve controls the lockup control valve, and a second on-off solenoid valve controls the control valve.

14 Claims, 4 Drawing Sheets

CONTROL SYSTEM FOR TORQUE CONVERTER

BACKGROUND OF THE INVENTION

1. Field of the Invention

The present invention relates to a control system for a torque converter, and in particular, to a control system for a torque converter with a lockup clutch directly connecting an input shaft with output shaft thereof.

2. Description of Related Art

There is known a conventional control system for a torque converter with a lockup clutch. Japanese Patent Laid-Open Publication No. 1-250667 discloses such a conventional control system for a torque converter with three valves, including a lockup shift valve selectively supplying fluid to an engaging side fluid chamber and a releasing side fluid chamber, respectively disposed in left and right portions, from the lockup clutch, a lockup control valve controlling the pressure difference between the fluid pressures in the engaging side fluid chamber and the releasing side fluid chamber, and a lockup timing valve controlling the lockup clutch to be in a complete engaging condition. The system further includes a duty solenoid valve for controlling the lockup control valve and one ON-OFF solenoid. The two valves of the lockup shift valve and the lockup timing valve are controlled based on both the control pressure generated by an OFF (closed) operation of the ON-OFF solenoid valve and the duty control pressure generated by the duty solenoid valve.

Table 1 shows conditions of the three valves, such as the lockup shift valve, the lockup control valve and the lockup timing valve, corresponding to conditions of the two solenoid valves and of the lockup clutch.

changing from X to 100% or from X to 0%, a responsiveness of the lockup clutch is decreased.

In order to resolve this problem, the duty solenoid valve could be is controlled based on the characteristics provided by an OFF operation of the ON-OFF solenoid valve which is shown as a dashed line in FIG. 4. This control also has problems when the converter condition is necessarily established, even when the complete lockup condition need to be established when the duty ratio X of the duty solenoid valve is located to the left of a switching point D. On the contrary, the perfect lockup condition is necessarily established, even when the converter condition needs to be established, when the duty ratio X is located to the right side of the switching point D.

Specifically, the converter condition needs to be established quickly so as to prevent engine stalling when the driver depresses the brake pedal rapidly under the condition B or the engaging force control condition. However, in this situation, there occurs a problem in that the complete lockup condition is established by the lockup timing valve being changed to the complete lockup control position as shown in Table 1 when the ON-OFF solenoid valve is changed directly to the OFF condition. In order to prevent this problem, the ON-OFF solenoid valve must be changed from the ON condition to the OFF condition after the duty ratio of the duty solenoid valve is once decreased to 0%. As a result, the operation of changing to the converter condition needs more time and, therefore, engine stalling may easily occur.

On the other hand, Japanese Laid-Open Patent Publication No. 63-186055 discloses regulating pressure valves and switching valves employed in a hydraulic

TABLE 1

|  | ON-OFF SOLENOID VALVE | DUTY SOLENOID VALVE | LOCKUP SHIFT VALVE | LOCKUP TIMING VALVE | LOCKUP CONTROL VALVE | CONTROL CONDITION |
| --- | --- | --- | --- | --- | --- | --- |
| CONDITION A | ON (OPENED) | HIGH DUTY RATIO | RELEASING PRESSURE DRAINED POSITION | ENGAGING FORCE CONTROL POSITION | ENGAGING FORCE CONTROL POSITION | STRONG SLIP CONDITION |
| CONDITION B | ON (OPENED) | LOW DUTY RATIO | DRAINED POSITION | ENGAGING FORCE CONTROL POSITION | ENGAGING FORCE CONTROL POSITION | WEAK SLIP CONDITION |
| CONDITION C | OFF (CLOSED) | ON (100%) | DRAINED POSITION | COMPLETE LOCKUP CONTROL POSITION | LOCKUP POSITION | COMPLETE LOCKUP CONDITION |
| CONDITION D | OFF (CLOSED) | OFF (0%) | INTRODUCING POSITION | ENGAGING FORCE CONTROL POSITION | NON-LOCKUP POSITION | CONVERTER CONDITION |

However, since the two solenoid valves control the operations of both of the lockup shift valve and the lockup timing valve, the conventional control system has problems such as those described below.

Referring to Table 1, such problems occur when engaging force control conditions or conditions A and B are respectively changed to a complete lockup condition C or a converter condition D. Referring to FIG. 5, the ON-OFF solenoid can change from an ON condition to an OFF condition quickly. On the other hand, the duty solenoid valve needs to change a present value of the duty ratio, shown as X, to 100% or 0%. As a result, since the complete lockup condition or the converter condition is not established while the duty ratio is circuit in an automatic transmission.

SUMMARY OF THE INVENTION

It is, therefore, an object of the present invention to provide a control system for a torque converter which can quickly change an engaging force control condition in a lockup clutch to a complete lockup condition or a converter condition and, therefore, the responsiveness the control operation of the lockup clutch can be improved.

It is another object of the present invention to provide a control system for a torque converter which can prevent engine stalling when a driver depresses a brake pedal rapidly while the lockup clutch is in an engaging force control condition.

It is still another object of the present invention to provide an improved valve having both regulating and switching functions.

These and other objects are achieved, according to the present invention, by providing a control system for a torque converter comprising lockup clutch means provided in said converter for connecting input and output members of the torque converter directly. The lockup clutch means includes an engaging chamber and a releasing chamber, lockup shift valve means for selectively switching communication between a fluid line having a predetermined pressure and the engaging chamber and communication between said fluid line and the releasing chamber, lockup control valve means for controlling a pressure difference between fluid pressures in the engaging chamber and the releasing chamber, control valve means for controlling said lockup clutch means so as to engage it completely, a first on-off solenoid valve controlling said lockup shift valve means, a duty solenoid valve controlling said lockup control valve means, and a second on-off solenoid valve controlling said control valve means.

Preferably, the second on-off solenoid valve is shared with another on-off solenoid valve provided in a hydraulic control circuit controlling engagement and release of frictional elements of an automatic transmission.

In another aspect of the present invention, there is provided a control valve including regulating and switching functions which are selectively switched by one spool. The control valve comprises, an input port, an output port and a drain port for performing the regulating function, and an input port, an output port and a drain port for performing the switching function. The said spool is positioned at respective first, second and third positions, said first position being located where the output port communicates with the input port for the switching function, said second position being located where the output port communicates with the drain port for the switching function and said third position being located between the first and second positions where the output port is shut off from both the input port and the drain port for the regulating function. The output port for the regulating function communicates with either one of the input port and the drain port by movement of the spool in a direction in parallel with the shaft. The communications between the respective ports for the switching function are unchanged by the movement of the spool when the spool is positioned at the third position.

Preferably, the respective output ports for the regulating and switching functions are provided in an intermediate portion in said control valve and said respective input ports and drain ports for the regulating and switching functions are provided in respective end portions in said control valve.

The above and other objects and features of the present invention will be apparent from the following description by making reference to the accompanying drawings illustrating a preferred embodiments of the present invention.

DESCRIPTION OF THE PREFERRED EMBODIMENT

The present invention will now be explained with reference to the preferred embodiment and the drawings.

Figure 1:
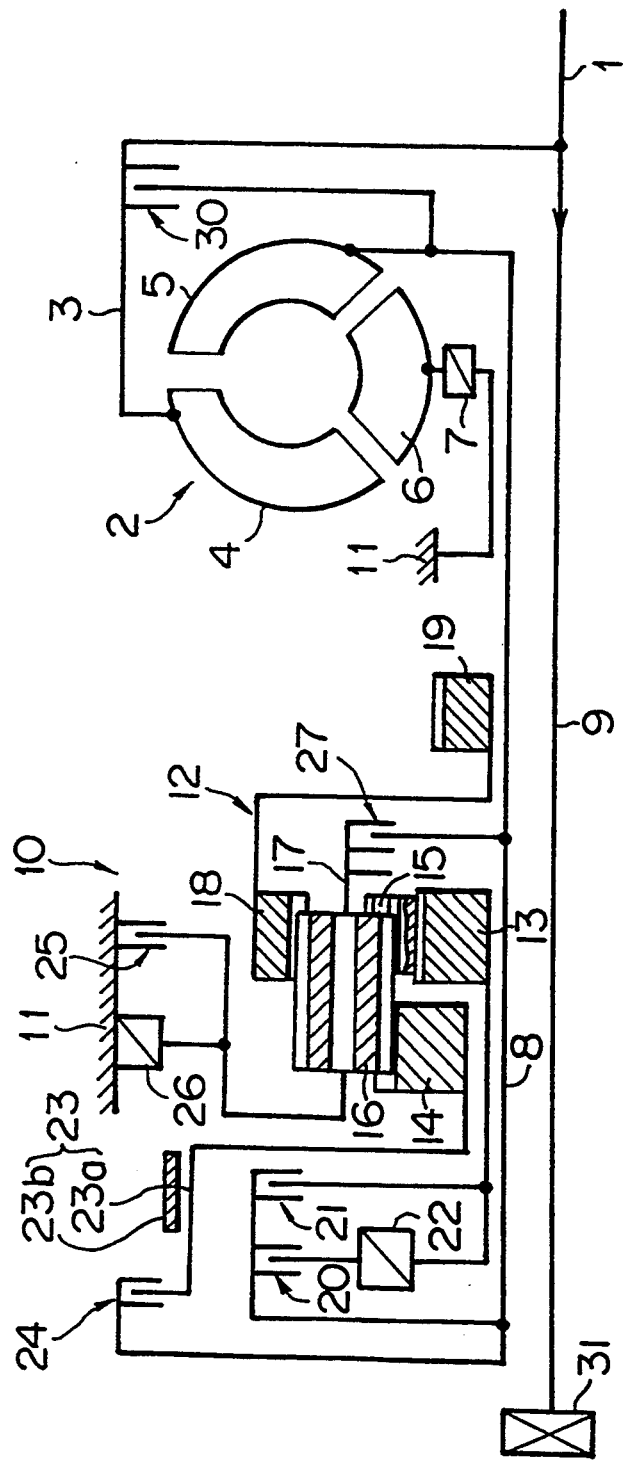
FIG. 1 is a schematic view of an automatic transmission to which a control system in accordance with the present invention can be applied.

FIG. 1, shows a schematic view of an automatic transmission. The automatic transmission includes a torque converter 2 which is one kind of a fluid coupling, and a multiple stage transmission gear mechanism 10 for establishing selectively a shift gear stage among the plural stages of different speed ratios.

The torque converter 2 includes a pump 4 on a case 3 connected to an engine output shaft 1, a turbine 5 facing the pump 4 and driven by the pump 4 through hydraulic fluid and a stator 6 disposed between the pump 4 and the turbine 5 and supported, by a transmission casing 11 through a one-way clutch 7 for performing a torque amplifying operation. Rotation of the turbine is transmitted to the transmission gear mechanism 10 through a converter output shaft 8.

The transmission gear mechanism 10 includes a Ravigneaux-type planetary gearset 12 having a small sun gear 13 movably mounted on the torque converter output shaft 8, a large sum gear 14 disposed rearward of the small sun gear 13 and movably mounted on the torque converter output shaft 8, a plurality of short pinion gears 15 meshed with the small sun gear 13, a long pinion gear 16 meshed with the short pinion gears 15 at a front portion and with the large sun gear 14 at a rear end portion thereof, a carrier 17 rotatably carrying the short and long pinion gears 15 and 16, and a ring gear 18 meshed with the long pinion gear 16.

Between the torque converter output shaft 8 and the small sun gear 13 is disposed a forward clutch 20 for controlling a torque transmission to the small sun gear 13 through a first one-way clutch 22 and a coast clutch 21 for controlling the torque transmission between the torque converter output shaft 8 and the small sun gear 13 in a juxtaposed relationship. A 2-4 brake 23, having a brake drum 23a connected with the large sum gear 13 and a brake band 23b engaged with the brake drum 23a, is disposed radially outward of the coast clutch 21. When the 2-4 brake 23 is engaged, the large sun gear 14 is fixed. A reverse clutch 24 for running in reverse is disposed adjacent to the 2-4 brake 23 to control the torque transmission between the large sun gear 14 and the torque converter output shaft 8 through the brake drum 23a. Between the carrier 17 and the transmission casing 11 are disposed a second one-way clutch 26 and a low & reverse brake 25 for engaging and disengaging the carrier 17 and the transmission casing 11 in a juxtaposed relationship. Between the carrier 17 and the torque converter output shaft is disposed a 3-4 clutch 27 for controlling the torque transmission between the carrier 17 and the torque converter output shaft 8. The ring gear 18 is connected with an output gear 19 disposed forward thereof.

Further, there is provided a lockup clutch 30 for connecting the engine output shaft 1 working as an input shaft of the torque converter 2 with the torque converter output shaft 8. An oil pump 31 is driven by the engine output shaft 1 through an intermediate shaft 9.

In the illustrated embodiment, the automatic transmission is provided with four shift gear stages in the forward direction and one shift gear stage in the reverse direction, and selectively establishes one of the shift gear stage through operations of the clutches 20, 21, 22, 24, 26 and 27 and the brakes 23 and 25.

Figure 2:
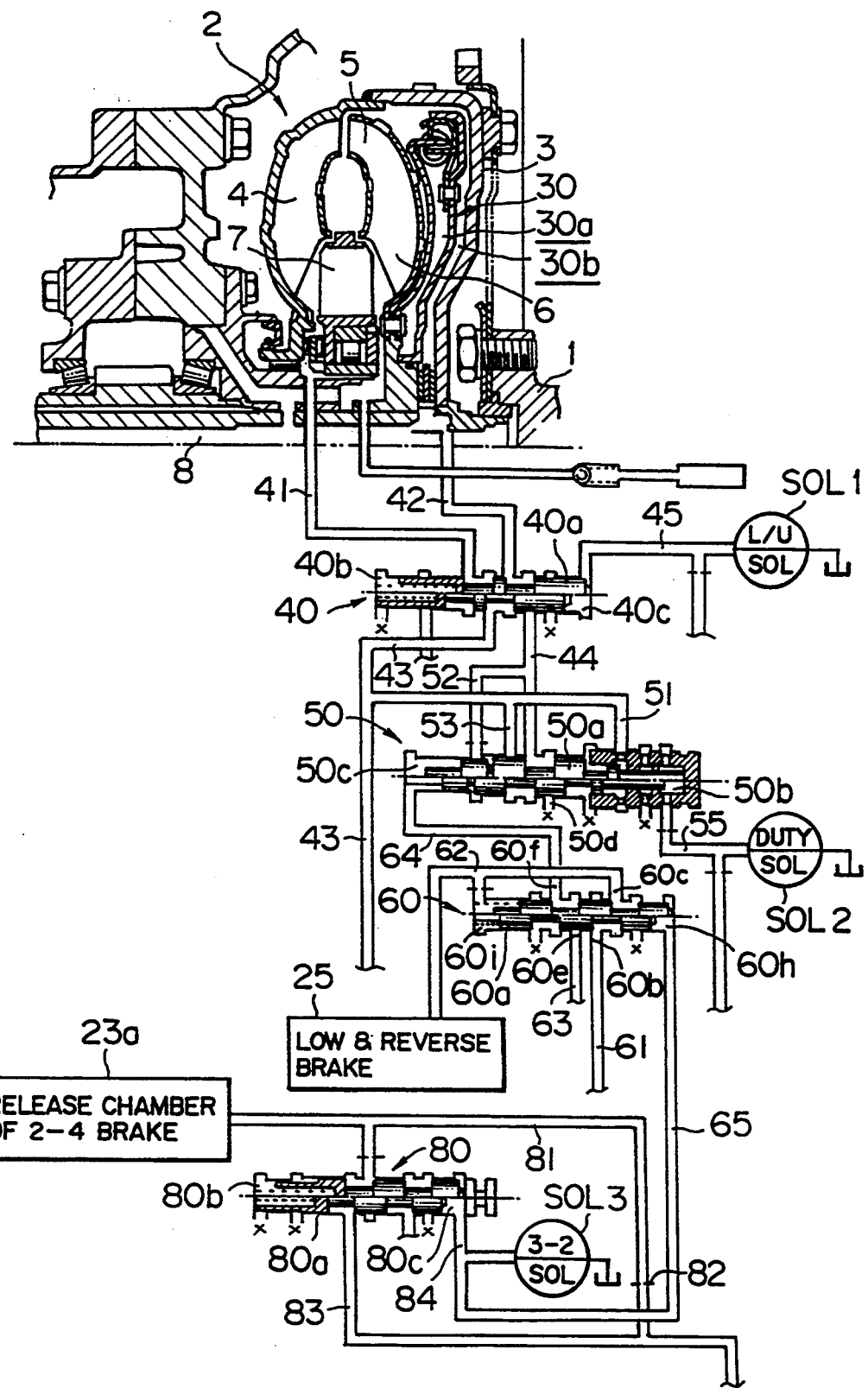
FIG. 2 is a hydraulic control circuit incorporated into the automatic transmission of FIG. 1 for controlling a lockup clutch.

Table 2 shows a relationship between the respective shift gear stages and operations of the frictional elements 20–27. In Table 2, (0) means that the corresponding element does not transmit torque when operated.

portion as illustrated in FIG. 2 so that the converter pressure fluid line 43 communicates with the releasing pressure fluid line 42 and the engaging pressure fluid line 41 is drained, allowing the lockup clutch 30 to be released perfectly. On the other hand, when the solenoid valve SOL1 is switched to the ON position so that the fluid line 45 is opened, the spool 40a is positioned in the upper portion as illustrated in FIG. 2 so that the converter pressure fluid line 43 communicates with the engaging pressure fluid line 41 and the releasing pressure fluid line 42 communicates with the engaging force control fluid line 44.

The lockup control valve 50 is provided to control the pressure difference between the engaging pressure in the engaging side fluid chamber 30a and the releasing pressure in the releasing side fluid chamber 30b in the lockup clutch 30. The lockup control valve 50 includes a spool 50a, a fluid pressure chamber 50b formed in the right portion from the spool 50a, a control chamber 50c formed in the left portion from the spool 50a and a drain

TABLE 2

| RANGE | CLUTCH | | | | BRAKE | | ONE-WAY CLUTCH | |
|---|---|---|---|---|---|---|---|---|
| | FORWARD | COAST | 3-4 | REVERSE | 2-4 | LOW-REVERSE | FIRST | SECOND |
| P | | | | | | | | |
| R | | | | O | | O | | |
| N | | | | | | | | (O) |
| D 1 | O | | | | | | (O) | |
| D 2 | O | | | | O | | (O) | |
| D 3 | O | | O | | O | | (O) | |
| D 4 | O | | O | | O | | | |
| S 1 | O | | | | | | (O) | (O) |
| S 2 | O | O | | | O | | (O) | |
| S 3 | O | O | O | | | | (O) | |
| L 1 | O | O | | | | O | (O) | |
| L 2 | O | O | | | O | | (O) | |

Referring to FIG. 2, there is shown the lockup clutch 30 and a control circuit for controlling an engaging force in the lockup clutch 30. There are provided an engaging side fluid chamber 30a, between the front face of the torque converter 2 and the lockup clutch 30, and a releasing side fluid chamber 30b between the lockup clutch 30 and the case 3.

The engaging force control circuit engages and releases the lockup clutch 30 and controls the engaging force in the lockup clutch 30. The control circuit is provided with a lockup shift valve 40, a lockup control valve 50 and a low-reducing valve or control valve 60.

The lockup shift valve 40 is provided so as to selectively switch communication between a converter pressure fluid line 43 and engaging and releasing pressure fluid lines 41 and 42 so that the engaging fluid pressure line 41, communicating with the engaging side fluid chamber 30a in the lockup clutch 30, communicates with the converter pressure fluid line 43 and the releasing pressure fluid line 42 communicating with the releasing side fluid chamber 30b, communicates with an engaging force control fluid line 44 communicating with the lockup control valve 50.

The lockup shift valve 40 includes a spool 40a, a spring 40b disposed on the left portion from the spool 40a and a fluid pressure chamber 40c formed in the right portion from the spool 40a. The fluid pressure chamber 40c communicates with a fluid line 45 in which there is provided an on-off solenoid valve or lockup solenoid valve SOL1 to open or close the fluid line 45. When the solenoid valve SOL1 is switched OFF so that the fluid line 45 is closed, the spool 40a is positioned in the lower port 50d. To the spool 50a, the fluid pressure in the converter pressure fluid line 43 is supplied through a pressure line 51 to move the spool in the left side direction, and the fluid pressure in the engaging force control fluid line 44 is supplied through the fluid line 52 to move the spool in the right side direction. Further, a nearly center portion of the spool 50a communicates with both the engaging force control fluid line 44 and a fluid line 53 communicating with the torque converter pressure fluid line 43. The fluid pressure chamber 50b located in the right portion from the spool 50a communicates with a fluid line 55 which is provided with a duty solenoid valve SOL2. Based on duty ratios of the duty solenoid valve SOL2, the fluid pressure in the fluid pressure chamber 50b of the lockup control valve 50 is controlled.

In the control circuit described above, the spool 50a of the lockup control valve 50 moves in right and left directions in FIG. 2, based on the total pressure of the fluid pressure in the converter pressure fluid line 43 and the fluid pressure in the fluid pressure chamber 50b controlled by the duty solenoid valve SOL2, both of which are applied to the spool 50a so as to move it in the left direction in FIG. 2, and the fluid pressure in the engaging force control fluid line 44 (the releasing pressure in the fluid chamber 30b) which is applied to the spool 50a so as to move in the right direction in FIG. 2. When the total pressure of the fluid line 43 and fluid pressure chamber 50b is greater than the pressure of control fluid line 44, the spool 50a is positioned as shown in the lower portion in FIG. 2 so that the converter pressure fluid line 43 communicates with the control fluid line 44 and the releasing pressure in the releasing side fluid chamber 30b is increased. On the other hand, when the releasing pressure in the chamber 30b is greater than the total pressure of the fluid line 43 and fluid pressure chamber 50b, the spool 50a is positioned as shown in the upper portion in FIG. 2 so that the control fluid line 44 communicates with the drain port 50d and the releasing pressure in the chamber 30b is decreased. Thus, the releasing pressure in the releasing side fluid chamber 30b is controlled according to duty ratios of the solenoid valve SOL2, so that the pressure difference between the engaging pressure in the fluid chamber 30a and the releasing pressure in the chamber 30b is controlled according to the duty ratios of the solenoid valve SOL2. As a result, the engaging force in the lockup clutch 30 is controlled.

The low-reducing valve 60 functions as a pressure regulator valve and a switching valve. As a pressure regulator valve, it reduces the engaging pressure supplied to the low & reverse brake at a first speed in the L range which first and second speeds are automatically shifted therebetween, and as a switching valve, it controls the lockup clutch 30 to be in complete engaging condition.

Figure 3A:
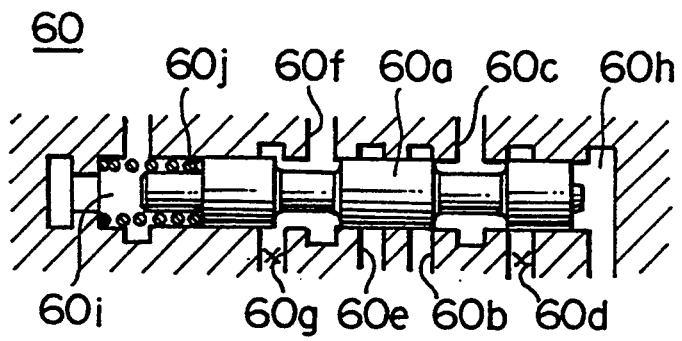
FIGS. 3A, 3B and 3C are respective enlarged sectional views of a low-reducing valve in accordance with the present invention.
Figure 3B:
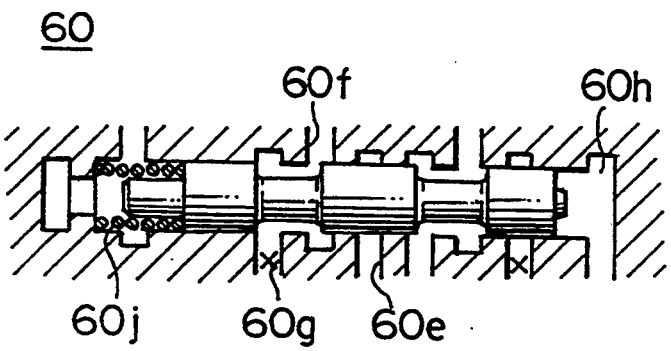
Figure 3C:
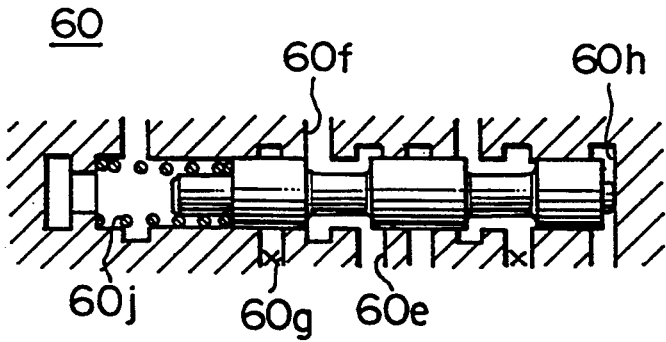

FIGS. 3A, 3B and 3C show the low-reducing valve 60 as including a spool 60a, three regulating ports, including an input port 60b, an output port 60c and a drain port 60d, three switching ports, such as an input port 60e, an output port 60f and a drain port 60g, a fluid pressure chamber 60h formed in the right portion from the spool 60a, and a spring chamber 60i wherein a spring 60j is inserted so as to bias the spool 60a toward the right direction.

The fluid pressure chamber 60h communicates with a fluid line 65 which is connected with the solenoid valve SOL3 of a 3-2 timing valve 80. The solenoid valve SOL3 is shared with the 3-2 timing valve 80 and works as an ON-OFF solenoid valve for controlling the low-reducing valve 60 independently. The input port 60b for a regulating function communicates with a fluid line 61 to which the line pressure is supplied in the L range, the output port 60c for regulating function communicates with a fluid line 62 communicating with the engaging fluid chamber of the low & reverse brake 25, and the fluid line 62 is introduced into the spring chamber 60i. Further, the input port 60e for a switching function communicates with a fluid line 63 (a fluid line supplying engaging pressure to the 3-4 clutch 27 ), and the output port 60f for the switching operation communicates with a fluid line 64 communicating with the control chamber 50c of the lockup control valve 50. To the fluid line 63, line pressure is supplied during respective third and fourth shift gear stages in an S range (automatic shift operation between the first shift gear stage through the third shift gear stage) and a D range (automatic shift operation between the first shift gear stage through the fourth shift gear stage).

Here, the respective output ports 60c, 60f are positioned in the center portion in the low-reducing valve 60, and the respective input ports 60b, 60e and the drain ports 60d, 60g are positioned in both side portions. Further, the input ports 60b, 60e are respectively positioned on the inner sides of the shaft direction, and the drain ports 60d, 60g are respectively positioned on the outer sides of the shaft direction.

The spool 60a is located at a first position as shown in FIG. 3C at which the output port 60f communicates with the input port 60e when the solenoid valve SOL3 of the 3-2 timing valve is switched ON and open. The spool 60a is located at a second position as shown in FIG. 3B at which the output port 60f communicates with the drain port 60g when the solenoid valve SOL3 of the 3-2 timing valve is switched OFF and closed. The spool 60a is located at an intermediate position between the first and second positions and a third position as shown in FIG. 3A at which the output port 60c is shut off from both of the input port 60b and drain port 60d.

In the third position (FIG. 3A), the output port 60c for regulating operation communicates with the input port 60b or the drain port 60d when the spool 60a moves a small amount to the right or left of the shaft direction from the shut off condition as shown in FIG. 3A. Conversely, in the third position, the output port 60f for the switching operation communicates with the drain port 60g and the output port 60 is shut off from the input port 60e. This relationship between respective ports 60b through 60g is provided so as not to be changed by small movement of the spool 60a.

There is further provided a 3-2 timing valve to reduce a shift shock which occurs during downshift operation from the third shift gear stage to the second shift gear stage. The releasing chamber 23a of the 2-4 brake 23 communicates a fluid line 81 with a reducer 82, and the bypass fluid line 83 is connected with the upper and down streams in the fluid line 81 from the reducer 82. The 2-3 timing valve is provided on the bypass fluid line 83 and includes a spool 80a, a spring 80b disposed in the left portion from the spool 80a and a fluid pressure chamber 80c disposed in the right portion from the spool 80a. The fluid pressure chamber 80c communicates with a fluid line 84 to which the 3-2 solenoid valve SOL3 or ON-OFF solenoid valve is connected.

When the automatic transmission is downshifted from the third shift gear stage to the second shift gear stage, the spool 80a is positioned in the lower portion in FIG. 2 when the 3-2 solenoid valve SOL3 is OFF and closed so that the bypass fluid line 83 is shut off, the releasing pressure in the chamber 23a of the servo mechanism is discharged gradually through the reducer 82, and then the 2-4 brake 23 is engaged gradually as the 3-4 clutch is released. Thereafter, when the 3-4 clutch 27 is released fully, the spool 80a is positioned in the upper portion by the 3-2 solenoid valve SOL3 being ON and open so that the bypass fluid line 83 communicates therebetween. As a result, since the release chamber 23a of the servo mechanism is released rapidly through the bypass fluid line 83, the 2-4 brake 23 is engaged rapidly.

Next will be described the relationship between the position of the spool 60a of the low-reducing valve and both regulating and switching functions.

When the solenoid valve SOL3 of the 3-2 timing valve 80 is switched ON and open, the fluid pressure in the drain chamber 60h of the low-reducing valve 60 is drained so that the spool 60a is biased by the spring 60j so as to be positioned at the right end or the first position as shown in FIG. 3C. Under this condition, when the shift lever is positioned in the S range or D range, the line pressure in the fluid line 63 is applied to the control chamber 50c of the lockup control valve 50 through the fluid line 64. As a result, the spool 50a is positioned in the upper portion in FIG. 2 so that the control fluid line 44 communicates with the drain port 50d, the releasing side fluid chamber 30b of the lockup clutch 30 is released completely, and then the lockup clutch 30 is engaged completely by the engaging force of the fluid chamber 30a.

Conversely, when the solenoid valve SOL3 of the 3-2 timing valve 80 is switched OFF and closed and the shift lever is in a position outside the L range so that no line pressure is supplied to the fluid line 61, the spool 60a of the low-reducing valve 60 is positioned against the biasing force of the spring 60j at the left end or the second position as shown in FIG. 3B. As a result, the lockup shift valve 40 is switched by the ON-OFF operation of the solenoid valve SOL1.

Further, when the solenoid valve SOL3 of the 3-2 timing valve 80 is switched OFF and closed and the shift lever is positioned in the L range, the spool 60a of the low-reducing valve 60 is positioned at the left end or the second position at the beginning so that the line pressure in the fluid line 61 is supplied through the fluid line 62 to the spring chamber 60i. As a result, since the force in the left direction by the fluid pressure in the fluid chamber 60h and the force in the right direction by the spring 60j and the fluid pressure in the spring chamber 60i are applied to the spool 60a, the spool 60a is positioned at an intermediate position, between the first position and second position i.e., in the third position as shown in FIG. 3A, at which the output port 60c for regulating operation is shut off from both of the input port 60b and the drain port 60d. At the third position, the spool 60a is forced to move in the right and left directions based on the pressure line 62 or the fluid pressure in the spring chamber 60i so that the fluid line 62 (the output port 60c) communicates with the fluid line 61 (the input port 60b) and the drain port 60d alternately. Thus, the fluid pressure in the fluid line 62, to which the reduced line pressure in the fluid line 61 is supplied, is supplied to the low & reverse brake 25.

Concurrently, the output port 60f for switching operation of the low-reducing valve 60 communicates with the drain port 60g and is shut off from the input port 60e. Under this condition, since the relationships between the spool 60a and the respective ports 60b–60g are arranged so they are unchanged by the movement of the spool 60a for the regulating operation, the low-reducing valve 60 does not lose the switching function at the third position.

Thus, the low-reducing valve 60 has both such regulating and switching functions when the spool 60a is positioned at the first, second and third positions. Therefore, according to the embodiment of the present invention, the total number of valves in the fluid circuit can be decreased and the circuit structure can be simplified.

Next, the operations of the two ON-OFF solenoid valves SOL1, SOL3 and the duty solenoid valve SOL2 and corresponding conditions of the lockup clutch 30 are shown in Table 3.

TABLE 3

| SOL 1 | SOL 2 | SOL 3 | CONTROL CONDITION |
|---|---|---|---|
| ON (OPENED) | DUTY | OFF (CLOSED) | STRONG SLIP CONDITON |
| ON (OPENED) | DUTY | OFF (CLOSED) | WEAK SLIP CONDITION |
| ON (OPENED) | OFF (CLOSED) | ON (OPENED) | COMPLETE LOCKUP CONDITION |
| OFF (CLOSED) | OFF (CLOSED) | OFF (CLOSED) | CONVERTER CONDITION |

According to the embodiment of the present invention, as shown in Table 3, the engaging force of the lockup clutch 30 is controlled as described below.

When the lockup solenoid valve SOL1 is switched ON, the spool 40a of the lockup shift valve 40 is positioned as shown in the upper portion in FIG. 2 so that the engaging force is supplied to the engaging side fluid chamber 30a of the lockup clutch 30 and the releasing side fluid line 42 communicating with the chamber 32b communicates with the control fluid line 44. Next, by controlling duty ratios of the duty solenoid valve SOL2, the lockup control valve 50 connects the control fluid line with the converter pressure fluid line 43 and the drain port 50d alternatively so that the fluid pressure or the releasing pressure in the control fluid line 44 is controlled based on the duty ratios. As a result, the engaging force of the lockup clutch 30 can be controlled based on the driving condition of the vehicle by employing the duty ratio corresponding to the pressure difference between the engaging pressure in the chamber 30a and the releasing pressure in the chamber 30b.

When the engaging force control condition in the lockup clutch 30 mentioned above is changed to the converter condition, the lockup solenoid valve SOL1 is controlled to be changed from the ON position to the OFF position. Thus, the spool 40a of the lockup shift valve 40 is position as shown at the lower portion in FIG. 2 so that the fluid pressure in the converter pressure fluid line 43 is supplied rapidly to the releasing side fluid chamber 30b through the releasing side fluid line 42. As a result, the lockup clutch 30 is released quickly to establish the converter condition. Therefore, when the driver depresses the brake pedal rapidly under the engaging force control condition of the lockup clutch 30, the lockup clutch 30 can be released quickly and engine stalling can be prevented with certainty.

Conversely, when the engaging force control condition in the lockup clutch 30 is changed to the complete lockup condition, the 3-2 solenoid valve SOL3 is switched ON and open. Thus, the spool 60a of the low-reducing valve 60 is positioned as shown at the upper portion in FIG. 2 so that the line pressure in the fluid line 63 is supplied through the fluid line 64 to the control chamber 50c of the lockup control valve 50. The spool 50a is the positioned at the upper portion in FIG. 2. As result, the engaging force control fluid line 44 communicates with the drain port 50a of the lockup control valve 50, the releasing side fluid chamber 30b is released so quickly, and therefore the lockup clutch 30 is engaged completely and quickly by the fluid pressure in the fluid chamber 30a.

Figure 4:
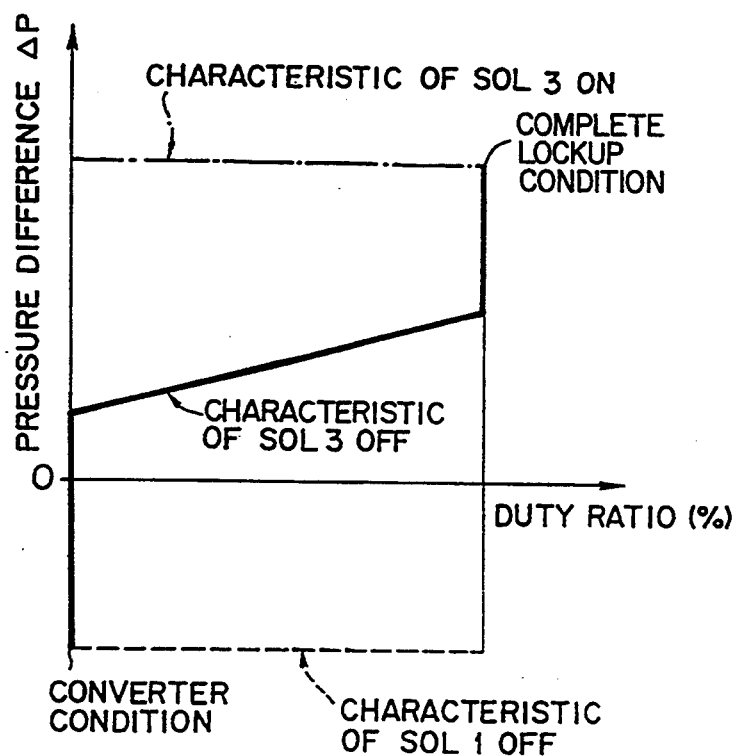
FIG. 4 a graphical representation showing a relationship between pressure difference and a duty ratio and ON-OFF operations of respective solenoid valves when a lockup clutch controlling condition is changed to a complete lockup condition or a converter condition.
Figure 5:
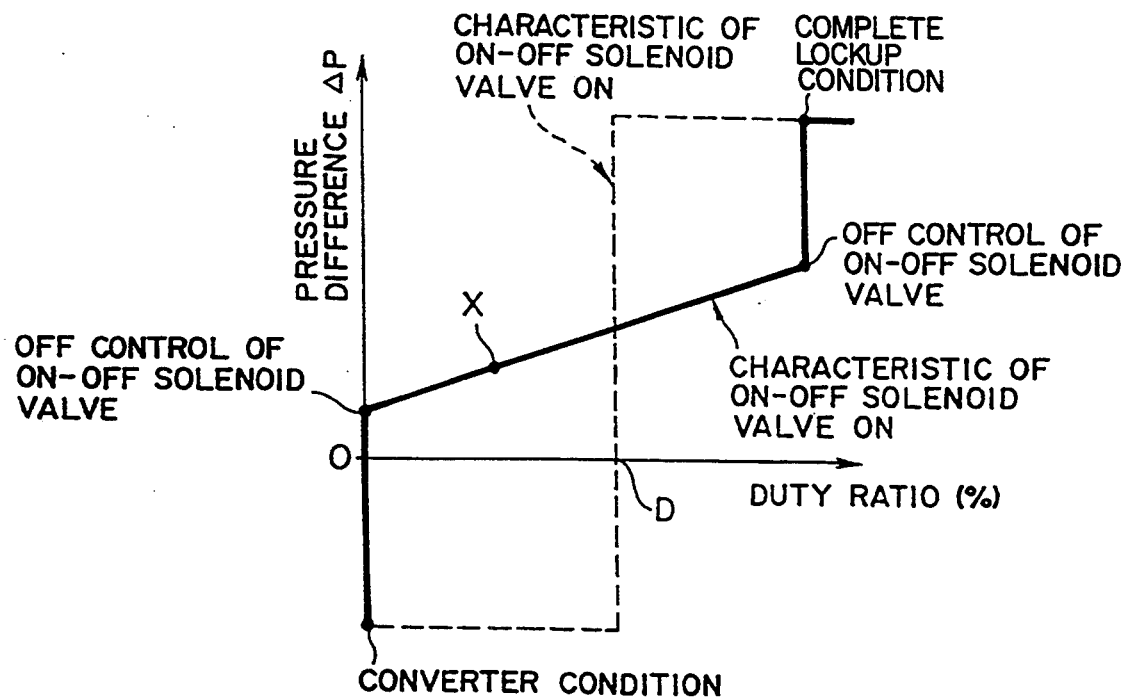
FIG. 5 is a graphical representation showing a conventional relationship corresponding to FIG. 4.

Referring to Table 3 and FIG. 4, in the embodiment of the present invention, the engaging force in lockup clutch 30 is controlled by the duty ratios of the duty solenoid valve SOL2 under the condition that lockup solenoid valve SOL1 is switched ON and opens and the 3-2 solenoid valve SOL3 is switched OFF and closed. Under this condition, the converter condition is established quickly when the lockup solenoid valve SOL1 is switched OFF and closed, and the complete engagement of the lockup clutch 30 is established quickly when the 3-2 solenoid valve SOL3 is switched ON and opens.

What is claimed is:

1. In combination, a torque converter and a control system for said torque converter comprising:
    lockup clutch means, provided in said torque converter, for directly connecting input and output members of the torque converter, said lockup clutch means including an engaging chamber and a releasing chamber;

lockup shift valve means for selectively switching communication between a fluid line having a predetermined pressure and the engaging chamber and communication between said fluid line and the releasing chamber;

lockup control valve means for controlling a pressure difference between fluid pressures in the engaging chamber and the releasing chamber;

control valve means for controlling said lockup clutch means so as to engage completely;

a first on-off solenoid valve controlling said lockup shift valve means;

a duty solenoid valve controlling said lockup control valve means; and a second on-off solenoid valve controlling said control valve means.

2. A combination as recited in claim 1 wherein said second on-off solenoid valve cooperates with said first on-off solenoid valve and is provided in a hydraulic control circuit to control engagement and release of frictional elements of an automatic transmission.

3. A combination as recited in claim 2 wherein said control system further comprises timing valve means for reducing shocks occurring during a downshift operation of the automatic transmission, and said second on-off solenoid valve establishes shift gear stages by controlling the control valve means and the timing valve means.

4. A combination as recited in claim 3 wherein said control valve means has regulating and switching functions which are selectively switched by one spool thereof, said control valve means comprising:

an input port, an output port and a drain port for performing the regulating function, and an input port, an output port and a drain port for performing the switching function;

said spool being positioned at respective first, second and third positions, said first position communicating the output port with the input port for performing the switching function, said second position communicating the output port with the drain port for performing the switching function and said third position being between the first and second positions and shutting the output port off from both the input port and the drain port for performing the regulating function;

said output port for performing the regulating function communicating with one of the input port and the drain port by movement, in a direction parallel with a shaft, of the spool, communication between the respective ports for performing the switching function being unchanged by said movement of the spool when the spool is positioned in the third position.

5. A combination as recited in claim 3 wherein said control valve means establishes lower shift gear stages.

6. A combination as recited in claim 5 wherein said control valve means controls the lockup clutch means so that it is in a complete lockup condition in any shift gear stage except said lower shift gear stages.

7. A combination as recited in claim 1 wherein said control valve means establishes shift gear stages.

8. A combination as recited in claim 7 wherein said control valve means includes regulating and switching functions which are selectively switched by one spool thereof, said control valve means comprising:

an input port, an output port and a drain port for performing the regulating function, and an input port, an output port and a drain port for performing the switching function;

said spool being selectively positioned at one of first, second and third positions, said first position being located such that the output port communicates with the input port for performing the switching function, said second position being located such that the output port communicates with the drain port for performing the switching function and said third position being located between the first and second positions so that the output port is shut off from both the input port and the drain port for performing the regulating function; and said output port for performing the regulating function communicating with one of the input port and the drain port by movement of the spool in a direction parallel with a shaft thereof and communications between respective ports for performing the switching function being unchanged by the movement of the spool when the spool is in the third position.

9. A combination as recited in claim 8 wherein said control valve means establishes lower shift gear stages.

10. A combination as recited in claim 9 wherein said control valve means controls the lockup clutch to be in a complete lockup condition at any shift gear stage except said lower shift gear stages.

11. A combination as recited in claim 7 wherein said control valve means establishes lower shift gear stages.

12. A combination as recited in claim 11 wherein said control valve means controls the lockup clutch so that it is in a complete lockup condition at any shift gear stage except said lower shift gear stages.

13. A control valve for performing regulating and switching functions which are selectively switched comprising:

a first input port, a first output port and a first drain port for performing the regulating function, and a second input port, a second output port and a second drain port for performing the switching function; and a spool positionable at respective first, second and third positions to switch said regulating and switching functions, said first position being located where the second output port communicates with the second input port for performing the switching function, said second position being located where the second output port communicates with the second drain port for performing the switching function and said third position being located between the first and second positions where the first output port is shut off from both the first input port and the first drain port for performing the regulating function;

said first output port for performing the regulating function communicating with one of the first input port and the first drain port by a movement of the spool in a direction parallel with a shaft thereof, communications between respective ports for performing the switching function being unchanged by movement of the spool when the spool is positioned in the third position.

14. A control valve as recited in claim 13 wherein the respective first and second output ports for performing the regulating and switching functions are provided in an intermediate portion of said control valve and the respective first and second input ports and drain ports for performing the regulating and switching functions are provided in respective end portions of said control valve.

* * * * *